US012738030B2

(12) United States Patent
Bajaj et al.

(10) Patent No.: US 12,738,030 B2
(45) Date of Patent: Sep. 15, 2026

(54) CONTEXT-AWARE ARTIFICIAL INTELLIGENCE SYSTEM FOR CONTENT MODERATION

(71) Applicant: Walmart Apollo, LLC, Bentonville, AR (US)

(72) Inventors: Rahul Bajaj, West Delhi (IN); Sandip Bhattacharjee, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/425,845

(22) Filed: Jan. 29, 2024

(65) Prior Publication Data

US 2025/0028748 A1 Jan. 23, 2025

Related U.S. Application Data

(60) Provisional application No. 63/527,920, filed on Jul. 20, 2023.

(51) Int. Cl.
*G06F 16/335* (2019.01)
*G06F 16/353* (2025.01)
(Continued)

(52) U.S. Cl.
CPC .......... *G06F 16/337* (2019.01); *G06F 16/353* (2019.01); *G06F 40/279* (2020.01); (Continued)

(58) Field of Classification Search
None
See application file for complete search history.

(56) References Cited

U.S. PATENT DOCUMENTS 6,675,384 B1 * 1/2004 Block ................ H04N 21/4542 348/E7.024
9,405,741 B1 * 8/2016 Schaaf .................... G10L 13/00
(Continued)

FOREIGN PATENT DOCUMENTS

IN 202341032821 6/2023

OTHER PUBLICATIONS

Gandhi et al., Scalable Detection of Offensive and Non-compliant Content / Logo in Product Images, 2020 IEEE Winter Conference on Applications of Computer Vision (WACV), Snowmass, CO, USA, 2020, pp. 2247-2256 2020.
(Continued)

*Primary Examiner* — Khanh B Pham
*Assistant Examiner* — Navneet Gmahl
(74) *Attorney, Agent, or Firm* — DICKINSON WRIGHT RLLP; Hector A. Agdeppa

(57) ABSTRACT

A method can include determining, via a multi-channel text model, a text profanity score for a textual content for an item. The method further can include determining, via a vision model, a vision profanity score for an image content for the item. In addition, the method can include determining whether the text profanity score exceeds a text blocking score. Moreover, the method can include determining whether the vision profanity score exceeds a vision blocking score. The method further can include upon determining that the text profanity score exceeds the text blocking score or that the vision profanity score exceeds the vision blocking score, setting a blocking label for the item in an item database as blocked. Other embodiments are disclosed.

20 Claims, 6 Drawing Sheets

(51) Int. Cl.

| | |
|---|---|
| ***G06F 40/279*** | (2020.01) |
| ***G06N 3/08*** | (2023.01) |
| ***G06V 10/774*** | (2022.01) |
| ***G06V 10/776*** | (2022.01) |
| ***G06V 20/30*** | (2022.01) |
| ***G06V 20/70*** | (2022.01) |
| *G06Q 10/40* | (2026.01) |

(52) U.S. Cl.

CPC ............. *G06N 3/08* (2013.01); *G06V 10/774* (2022.01); *G06V 10/776* (2022.01); *G06V 20/30* (2022.01); *G06V 20/70* (2022.01); *G06Q 10/40* (2026.01)

(56) References Cited

U.S. PATENT DOCUMENTS

| | | | | |
|---|---|---|---|---|
| 11,140,446 | B2 * | 10/2021 | Pau | H04N 21/4318 |
| 11,514,337 | B1 * | 11/2022 | Karpman | G06V 10/764 |
| 11,589,116 | B1 * | 2/2023 | Omar | G06V 20/44 |
| 11,617,008 | B1 * | 3/2023 | Gupta | G06N 3/048<br>725/9 |
| 11,829,413 | B1 * | 11/2023 | Hao | G06N 20/00 |
| 11,829,717 | B1 * | 11/2023 | Chen | G06N 3/048 |
| 11,917,222 | B1 * | 2/2024 | ReMine | G06F 40/205 |
| 12,105,755 | B1 * | 10/2024 | Omar | G06N 3/045 |
| 12,500,909 | B1 * | 12/2025 | Westenberger | H04L 63/1416 |
| 2011/0283309 | A1 * | 11/2011 | Bliss | G06F 40/166<br>725/25 |
| 2020/0275158 | A1 * | 8/2020 | Gaur | G06N 3/08 |
| 2021/0019339 | A1 | 1/2021 | Ghulati et al. | |
| 2021/0058352 | A1 | 2/2021 | Fogu et al. | |
| 2021/0329338 | A1 * | 10/2021 | Khov | G06V 20/49 |
| 2022/0207864 | A1 * | 6/2022 | Autès | G06V 10/82 |
| 2022/0248091 | A1 * | 8/2022 | Pau | H04N 21/23418 |
| 2022/0350990 | A1 * | 11/2022 | Phillips | G06F 18/40 |
| 2022/0414137 | A1 * | 12/2022 | Sewak | G06F 16/3346 |
| 2022/0417194 | A1 * | 12/2022 | Prabhu | G06F 3/04817 |
| 2023/0222604 | A1 | 7/2023 | Claudio | |
| 2024/0323486 | A1 * | 9/2024 | Pau | H04N 21/466 |
| 2024/0386459 | A1 * | 11/2024 | Barker | G06Q 30/0242 |
| 2024/0414394 | A1 * | 12/2024 | Christensen | H04N 21/44008 |
| 2025/0111160 | A1 * | 4/2025 | Reis Alves | G06F 40/216 |
| 2025/0329060 | A1 * | 10/2025 | Gómez | G06V 10/82 |

OTHER PUBLICATIONS

Singh, A., Classifying Products as Banned Or Approved using Text Mining Part-I, Toward Data Science, retrieved from towardsdatascience.com/classifying-products-as-banned-or-approved-using-text-mining-5b48d2eb1544 Jan. 2, 2019.

* cited by examiner

Network Adapter
220
Memory ROM/RAM
208
Hard Drive
114
CD-Rom Drive
116
Universal Serial Bus
112
Disk Controller
204
Graphics Adapter
224
214
System Bus
Video Controller
202
Monitor
106
CPU
210
Keyboard Adapter
226
Keyboard
104
Mouse Adapter
206
Mouse
110
Other I/O Devices
222

600

620 Stratifying the training image data in the domain-specific labeled image database(s) based on one or more of item types and/or image labels for the training image data 630 Training the vision model using multi-fold cross validation 6310 Training multiple vision models 6320 Training a linear layer to generate a vision profanity score for multiple tensors

CONTEXT-AWARE ARTIFICIAL INTELLIGENCE SYSTEM FOR CONTENT MODERATION

CROSS-REFERENCE TO RELATED APPLICATIONS

This application claims the benefit of U.S. Provisional Patent Application No. 63/527,920, filed Jul. 20, 2023. U.S. Provisional Patent Application No. 63/527,920 is incorporated herein by reference in its entirety.

TECHNICAL FIELD

This disclosure relates generally to techniques for screening content for social media marketing.

BACKGROUND

Social media marketing has been popular among retailers to promote products. However, not all products are proper for promotion on social media. For example, the descriptions or images for adult products, weapons, or some clothing might not be suitable for safe, family-friendly platforms. As such, systems and methods for detecting and moderating brand-damaging item contents are desired.

BRIEF DESCRIPTION OF THE DRAWINGS

To facilitate further description of the embodiments, the following drawings are provided in which.

Figure 1:
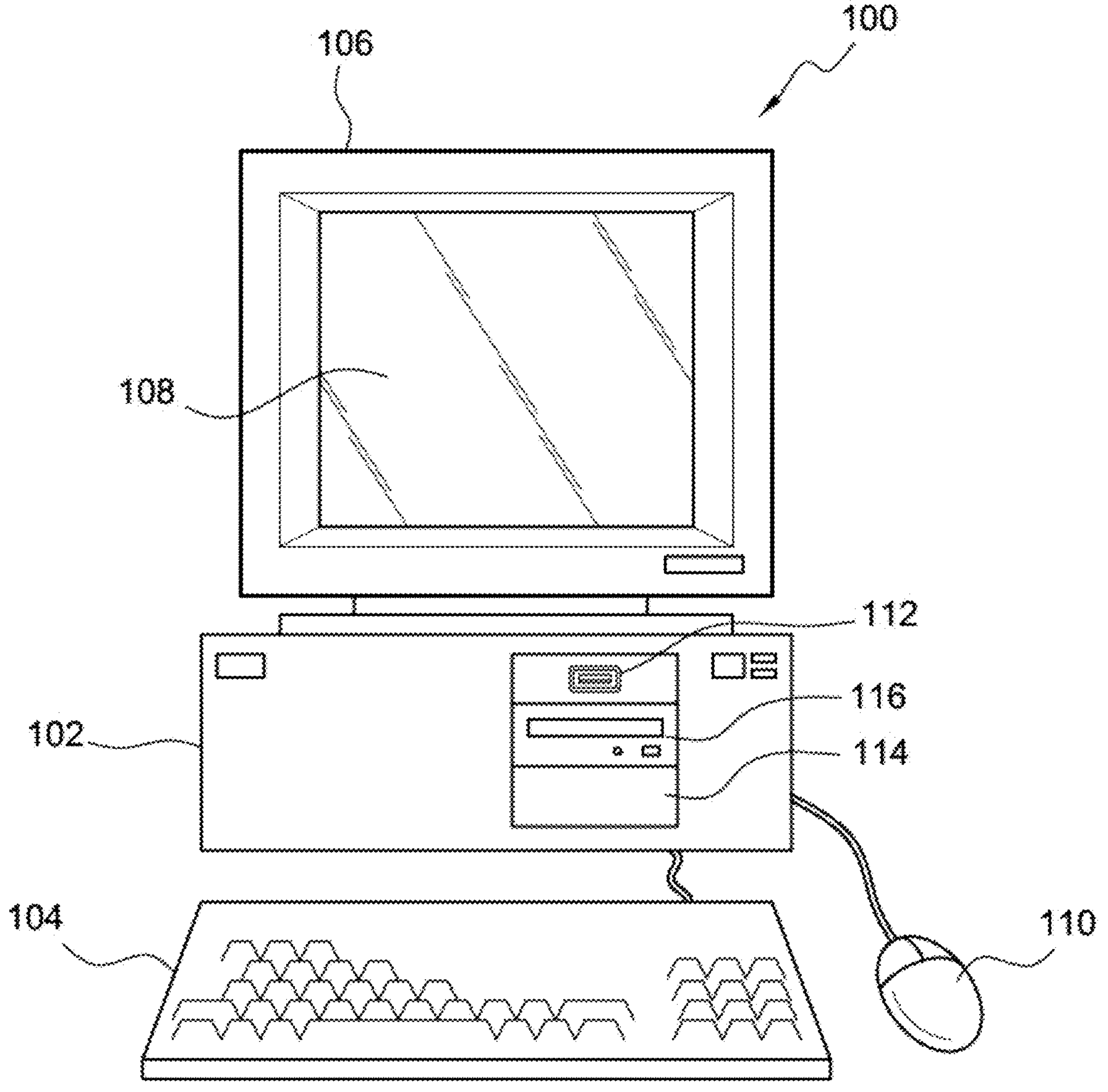
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

DESCRIPTION OF EXAMPLES OF EMBODIMENTS

Figure 2:
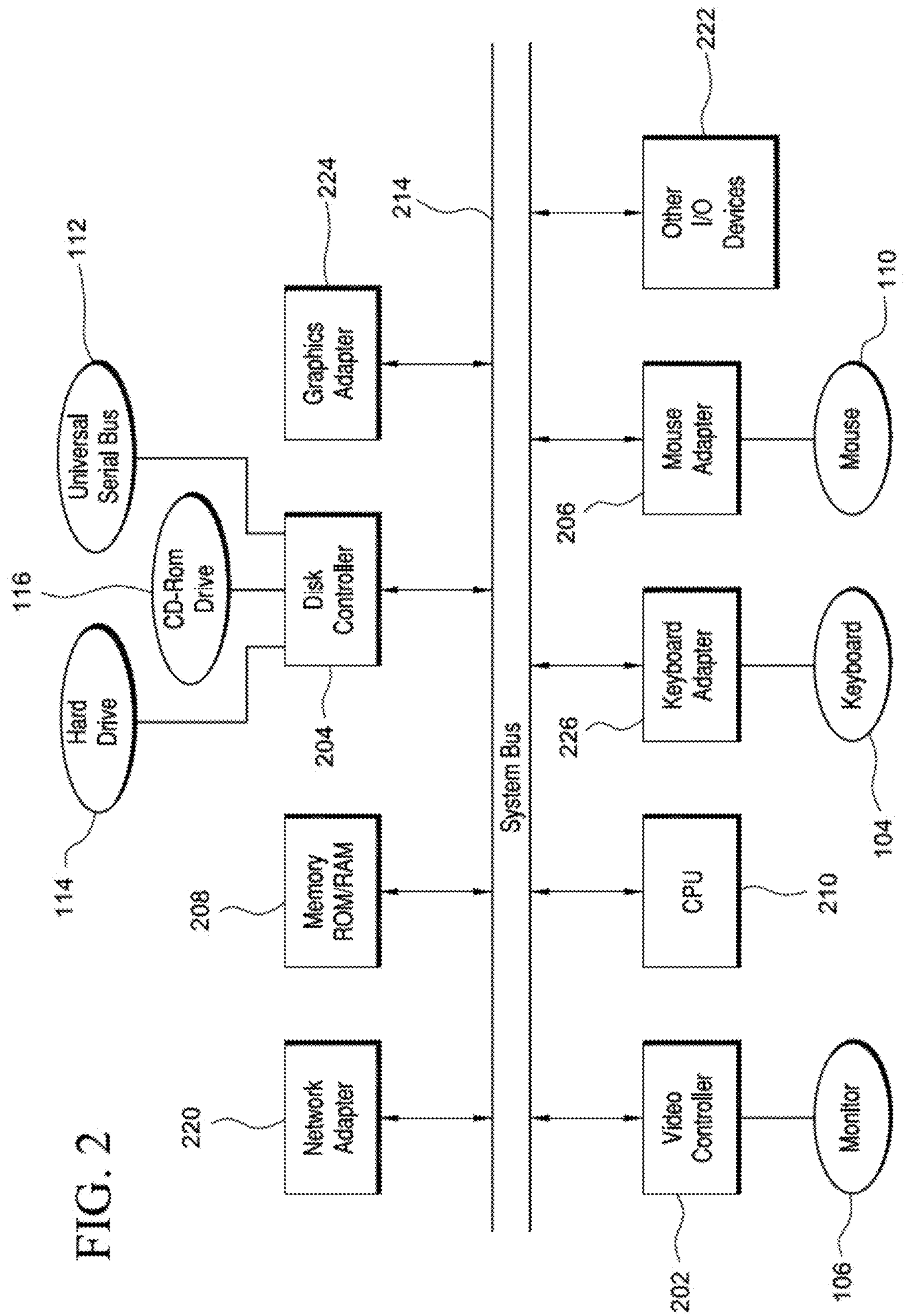
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
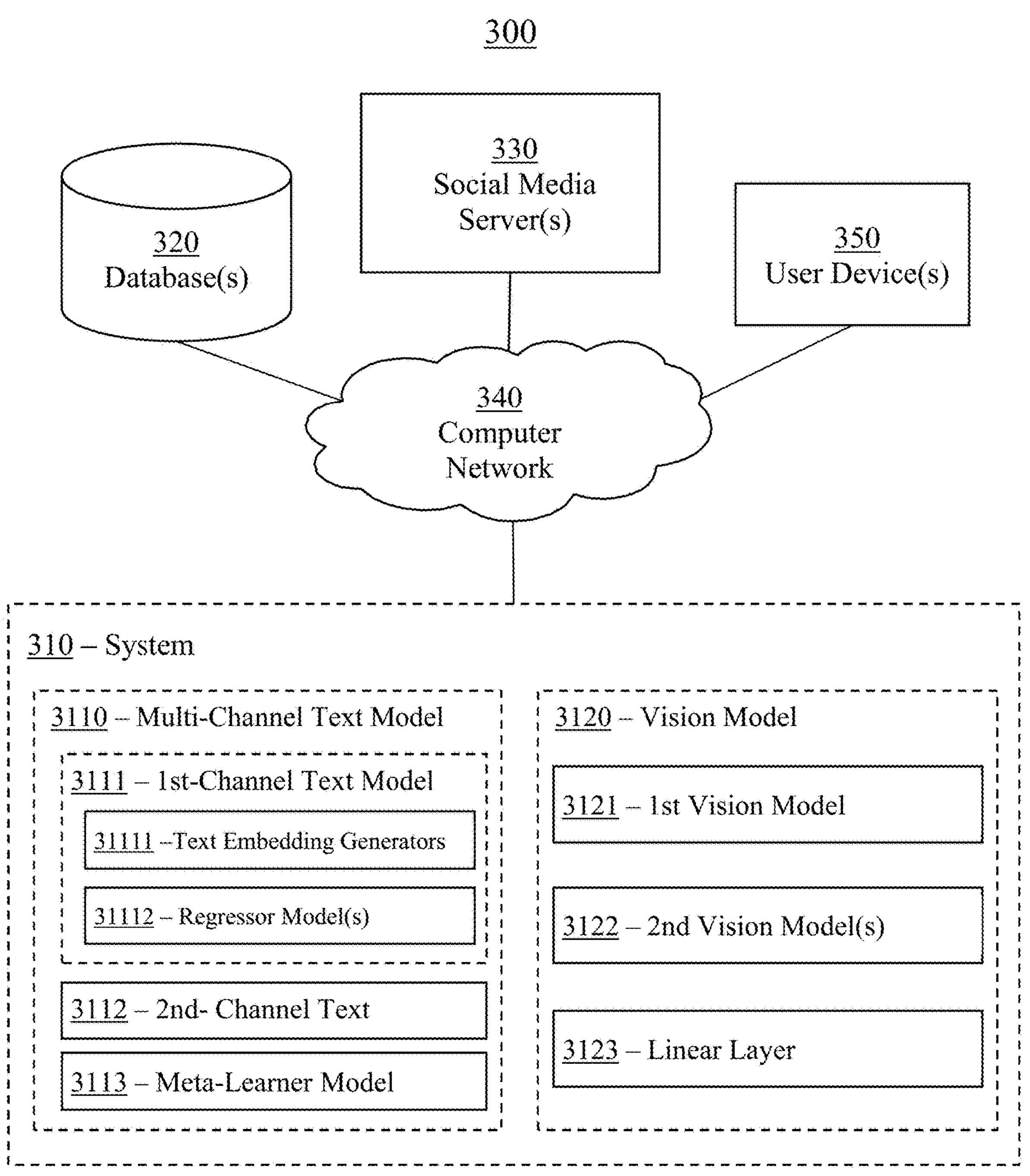
FIG. 3 illustrates a block diagram of a system for detecting and moderating offensive item contents, according to an embodiment.

Turning ahead in the drawings, FIG. 3 illustrates a block diagram of a system 300 for detecting and moderating profanity, nudity, and/or offensive contents in item contents, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., a system 310), one or more social media servers (e.g., a social media server(s) 330, etc.), and one or more user devices (e.g., a user device(s) 350). System 310, social media server(s) 330, and user device(s) 350 can each be a computer system, such as computer system 100 (FIG. 1), as described above, and can each be a single computer, a single server, or a cluster or collection of computers or servers, or a cloud of computers or servers. In another embodiment, a single computer system can host each of system 310, social media server(s) 330, and/or user device(s) 350. In many embodiments, system 310 can be modules of computing instructions (e.g., software modules) stored at non-transitory computer readable media that operate on one or more processors. In other embodiments, system 310 can be implemented in hardware. In many embodiments, system 310 can comprise one or more systems, subsystems, modules, models, or servers (e.g., a multi-channel text model 3110, a 1st-channel text model 3111, a 2nd-channel text model(s), a meta-learner model 3113, a vision model 3120, a 1st vision model 3121, a 2nd vision model(s) 3122, a linear layer 3123, etc.). Additional details regarding system 310, social media server(s) 330, and/or user device(s) 350 are described herein.

In some embodiments, system 310 can be in data communication, through a computer network, a telephone network, or the Internet (e.g., computer network 340), with social media server(s) 330 and/or user device(s) 350. In some embodiments, user device(s) 350 can be used by users, such as social media users, users for an online retailer's websites, customers or potential customers for a retailer, and/or a system operator or administrator for system 310. In a number of embodiments, system 310 can host one or more websites and/or mobile application servers. For example, system 310 can host a website, or provide a server that interfaces with an application (e.g., a mobile application or a web browser), on user device(s) 350, which can allow users to browse, search, and/or order products, in addition to other suitable activities. In some embodiments, an internal network (e.g., computer network 340) that is not open to the public can be used for communications between system 310 and user device(s) 350 within system 300.

In certain embodiments, the user devices (e.g., user device(s) 350) can be a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., a database(s) 320). The one or more databases can include a product database that contains information about products, SKUs (stock keeping units), inventory, and/or online orders, for example, among other information. The one or more databases further can include a user profile database that contains user profiles of users, including information such as account data, historical transaction data, etc. The one or more databases additionally can include training datasets for various machine learning (ML) and/or artificial intelligence (AI) models, modules, or systems, including training text data (e.g., natural language conversations, online comments, etc., that are labeled or unlabeled), training image data (e.g., labeled retail product images, or domain-specific images that are labeled or unlabeled), and/or training tensors, etc. The training datasets can be obtained from private data sources (e.g., a retailer's domain-specific training datasets) or publicly available data sources (e.g., Wikipedia™: Talk pages with comments, Civil Comments datasets, etc.)), and/or curated from historical input/output data of a pre-trained ML/AI model, etc.

The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, and/or the one or more databases (e.g., database(s) 320) can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can be configured to determine, via a multi-channel text model (e.g., multi-channel text model 3110), a text profanity score for a textual content (e.g., titles, short descriptions, detailed descriptions, etc.) for an item. The text profanity score can indicate a likelihood of unacceptable suggestive/explicit content, sarcastic remarks, and/or various forms of offensive language in the textual content. System 310 further can be configured to determine, via a vision model (e.g., vision model 3120), a vision profanity score for an image content for the item. The vision profanity score can indicate a likelihood that the image content includes improper racy, offensive, graphically explicit, and nudity-absorbed content that might be deemed distasteful or harmful to a brand's image. The item can be a product featured by a retailer or any content to be promoted on a social media platform. The textual content, the image content, and/or other information for the item, can be obtained, via computer network 340 by system 310 from database(s) 320. The scores (e.g., the text profanity scores and/or the vision profanity scores) each can be a numerical value, such as a normalized value indicating an estimated degree of profanity between zero (the lowest) and one (the highest).

In a number of embodiments, system 310 also can be configured to determine whether the text profanity score exceeds a text blocking score (e.g., 0.75, 0.80, 0.90, etc.). System 310 additionally can be configured to determine whether the vision profanity score exceeds a vision blocking score (e.g., 0.77, 0.85, 0.89, 0.95, etc.). The text blocking score and the vision blocking score can be similar or different.

In many embodiments, system 310 further can include upon determining that the text profanity score exceeds the text blocking score or that the vision profanity score exceeds the vision blocking score, set a blocking label for the item in an item database (e.g., database(s) 320) as blocked. In certain embodiments, the blocking label for an item in the item database can be blank or unblocked by default, and once set, fixed or reviewed and updated regularly (e.g., whenever accessed, every 3 or 6 months, based on an expiration time for each blocking label, etc.) by system 310. In embodiments where the blocking label for an item is fixed once set, system 310 further can be configured to check the blocking label so that system 310 can skip some or more of the abovementioned activities.

In a number of embodiments, multi-channel text model 3110 can include a first channel text model (e.g., 1st-channel text model 3111), one or more second channel text models (e.g., 2nd-channel text model(s) 3112), and an integrating model (e.g., meta-learner model 3113). In some embodiments, meta-learner model 3113 can be configured or trained to generate the text profanity score for the textual content for the item based on: (a) a first text profanity score for the textual content for the item, as generated by 1st channel text model 3111, and (b) a respective text profanity degree for each of profanity categories for the textual content for the item, as generated by 2nd channel text model(s) 3112. Example of the profanity categories can include General Toxicity, Severe Toxicity, Threat, Insult, Identity Hate, and/or Obscenity, etc. that can be defined based on the types and/or levels of toxicity and profanity. The respective text profanity degree for a profanity category can be a numerical value, such as a normalized value between zero (the lowest) and one (the highest), indicating a likelihood that the textual content can be classified in the profanity category. Examples of meta-learner model 3113 can include the Memory-Augmented Neural Network (MANN) model, a Meta Networks (MetaNet) model, a Siamese neural network model, a Relation Network (RN) model, an LSTM Metal Learner, etc.). In various embodiments, the profanity categories can be mutually exclusive, partially mutually exclusive, or not exclusive at all.

In several embodiments, each of multi-channel text model 3110, 1st-channel text model 3111, 2nd-channel text model(s) 3112, and/or meta-learner model 3113 can include one or more suitable ML and/or AI models, modules, or systems, pre-trained and/or re-trained iteratively based on respective training data. The one or more ML algorithms for 1st-channel text model 3111 and/or 2nd-channel text model(s) 3112 can be different. In a few embodiments, 1st-channel text model 3111 can include one or more text embedding generators (e.g., text embedding generators 31111) and if multiple text embedding generators are included, one or more regressor models (e.g., a regressor model(s) 31112).

In some embodiments, text embedding generators 31111 can include a first text embedding generator configured to generate a first text embedding for the textual content for the item, and a second text embedding generator configured to generate a second text embedding for the textual content for the item. The first text embedding generator can be different from the second text embedding. For example, the first text embedding generator can include one or more context-aware embedding algorithms configured to generate the first text embedding to reflect the relevance of words in a single document and the words' contextual implications in relation to other documents (e.g., Half-Bert, Language Model version 12 (LMv12), Word2Vec, etc.). The second text embedding generator can include one or more statistics-based algorithms configured to generate a first text embedding to capture the importance of words in a document (e.g., Term Frequency (TF), Term Frequency-Inverse Document Frequency (TF-IDF), etc.).

In many embodiments, regressor model(s) 31112 of 1st-channel text model 3111 can include one or more lightweight regressor models configured to generate the first text profanity score for the textual content for the item based on: (a) the first text embedding, as generated by the first text embedding generator; and (b) the second text embedding, as generated by the second text embedding generator. In a number of embodiments, the one or more lightweight regressor models for the regressor model(s) 31112 can be further configured to use at least two different regression algorithms (e.g., Gradient-Boosted Trees (XGBoost), CatBoost, Ridge Regression, Lasso Regression, ElasticNet, etc.), each configured to generate a respective text score for the textual content for the item. In similar or different embodiments where the one or more lightweight regressor models uses different regression algorithms, regressor model(s) 31112 (via the one or more lightweight regressor models) can determine the first text profanity score for the textual content for the item further based on the respective text score, as generated by each of the different regression algorithms.

In many embodiments, 2nd-channel text model(s) 3112 also can include one or more suitable ML algorithms (e.g., BERT, DistilBERT, LitMC-BERT, RoBERTa, XLNet, etc.) pre-trained and/or re-trained to extract objective information regarding the respective degree of profanity in different profanity categories.

In many embodiments, vision model 3120 can include an ensemble learning model. The ensemble learning model can include: (a) a first vision model (e.g., 1st vision model 3121) configured to generate a first tensor; (b) one or more second vision models (e.g., 2nd vision model(s) 3122) configured to generate a second tensor(s); and (c) a linear layer (e.g., linear layer 3123) pre-trained and/or re-trained to generate the vision profanity score based on the first tensor and the second tensors. In a number of embodiments, each of 1st vision model 3121 and 2nd vision model(s) 3122 can be different. For example, 1st vision model 3121 and 2nd vision model(s) 3122 can include different one or more ML and/or AI models, modules, or systems configured to generate multi-dimensional tensors based on image contents, such as Convolutional Neural Network (CNN), ConvNext, EfficientNet, EfficientNetV2, EfficientNetB3, ResNet, etc. The first tensor and the second tensor(s) can be of the same or different dimensions. In many embodiments, the first tensor and the second tensor(s) can be combined or fused into a high-dimensional output tensor (e.g., a 128-dimensional tensor, a 256-dimensional tensor, etc.) to be inputted to linear layer 3123 to generate the vision profanity score (e.g., a normalized value between 0 and 1) for the image content for the item. Examples of linear layer 3123 can include a neural network model, a fully-connected layer model, etc.

In many embodiments, system 310 further can be configured to train multi-channel text model 3110 to generate the text profanity score for the textual content for the item based on training text data in one or more labeled comment databases (e.g., database(s) 320). Examples of the training text data can include labeled comments and/or conversations in private databases (e.g., a research entity's database, etc.), publicly available databases (e.g., comments from Wikipedia™: Talk pages and Civil Comments datasets, etc.), and/or historical input/output data of pre-trained multi-channel text model 3110. In some embodiments, 1st-channel text model 3111 and 2nd-channel channel text model(s) 3112 can be different. In several embodiments, training multi-channel text model 3110 can include training 1st-channel text model 3111 to generate the first text profanity score for the textual content based on the one or more labeled comment databases, and training 2nd-channel text model(s) 3112 to generate the respective text profanity degree for the textual content for each of profanity categories based on the one or more labeled comment databases.

In a number of embodiments, training multi-channel text model 3110 further can include, before training 1st-channel text model 3111 and before training 2nd-channel text model(s) 3112, removing one or more unwanted elements from training text data in the one or more labeled comment databases. The one or more unwanted elements can include extra spaces, symbols, embedded URL links, HTML tags, and/or emojis, etc., excluding those used in slang spoofing. In certain embodiments, the one or more unwanted elements can be different for different models (e.g., 1st-channel text model 3111 and 2nd-channel text model(s) 3112), and removing one or more unwanted elements for the different models can be performed independently. In a few embodiments, removing one or more unwanted elements can be performed for one model, but not the other (e.g., only before training 1st-channel text model 3111 but not 2nd-channel text model(s) 3112, or vice versa, etc.). In several embodiments, 2nd-channel text model(s) 3112 can be configured for multi-label training in a multi-Graphics-Processing-Unit (GPU) environment for faster training. In some embodiments, the one or more lightweight regressor models of regressor model(s) 31112 can each be trained using multi-fold (e.g., 3-fold, 5-fold, 10-fold, etc.) cross validation to ensure robust accurate results.

In many embodiments, system 310 further can be configured to train vision model 3120 to generate the vision profanity score for an item image based on one or more domain-specific labeled image databases (e.g., database(s) 320, a retailer's product database with labeled product images, etc.). Before training vision model 3120, system 310 further can be configured to augment training image data in database(s) 320 to increase not only the volume but also the quality (e.g., variations and/or balance) of the training image data. In a number of embodiments, system 310 can augment the training image data by: (a) transforming (e.g., rotating, flipping vertically and/or horizontally, or adjusting contrast, etc.) the training image data into varied image data; and storing the varied image data in database(s) 320; and/or (b) stratifying the training image data in database(s) 320 based on one or more of item types or image labels for the training image data.

System 310 can include any suitable data augmentation unit implemented in hardware, or a combination of hardware, software, and/or firmware to perform the transformation of the training image data. Further, system 310 can stratify the training image data based on their respective item types and/or image labels in order to maintain a balanced representation of training data for vision model 3120. In some embodiments, system 310 also can train vision model 3120 using multi-fold (e.g., 2-fold, 5-fold, 10-fold, 15-fold, etc.) cross validation to ensure more robust and accurate outputs of the model, as trained.

In a number of embodiments, system 310 further can process text and/or image data in a cloud native platform environment. In some embodiments, system 310 can be implemented as a stateless Kafka consumer (or another suitable messaging system), which can provide efficient processing through the text and vision models (e.g., multi-channel text model 3110 and vision model 3120) in a single pod. Through this architecture, item details and metadata can be ingested from the input Kafka, such as from the MOSAIC service.

In many embodiments, various mechanisms can be adopted to increase the efficiency in the training and/or inference phases. For example, system 310 further can include modern accelerators (e.g., GPUs, Tensor Processing Units (TPUs), etc.) to accelerate the training processes for one or more ML models (e.g., multi-channel text model, 1st-channel text model, 2nd-channel text model(s), vision model 3120, 1st vision model 3121, 2nd vision model(s) 3122, etc.). In some embodiments, during the processing stage, system 310 can handle text and image data in parallel in order to generate faster results.

In many embodiments, system 310 further can be configured to optimize speed and reducing costs in the inference process while handling a substantial volume of data at a large scale. For example, in certain embodiments, title, short description, and detailed description inferences for each product can be generated. Furthermore, system 310 can obtain item image URLs from upstream sources (e.g., a product database, database(s) 320, etc.) to allow for easy downloading and storage of image assets in an in-memory cache. This process can enhance faster processing, with the object subsequently forwarded to vision model 3120 for inference and vision profanity score calculations.

In some embodiments, after validating the text profanity scores (determined by multi-channel text model 3110) and/or the image profanity scores (determined by vision model 3120) against one or more predefined thresholds (e.g., the text blocking score and/or vision block score) and after setting the appropriate blocking labels (blocked or unblocked) to the items, information for the items, including the blocking labels and metadata, can be transmitted to a downstream Kafka. Then, temporary files in RAM can be cleared to pave the way for further processing.

Figure 4:
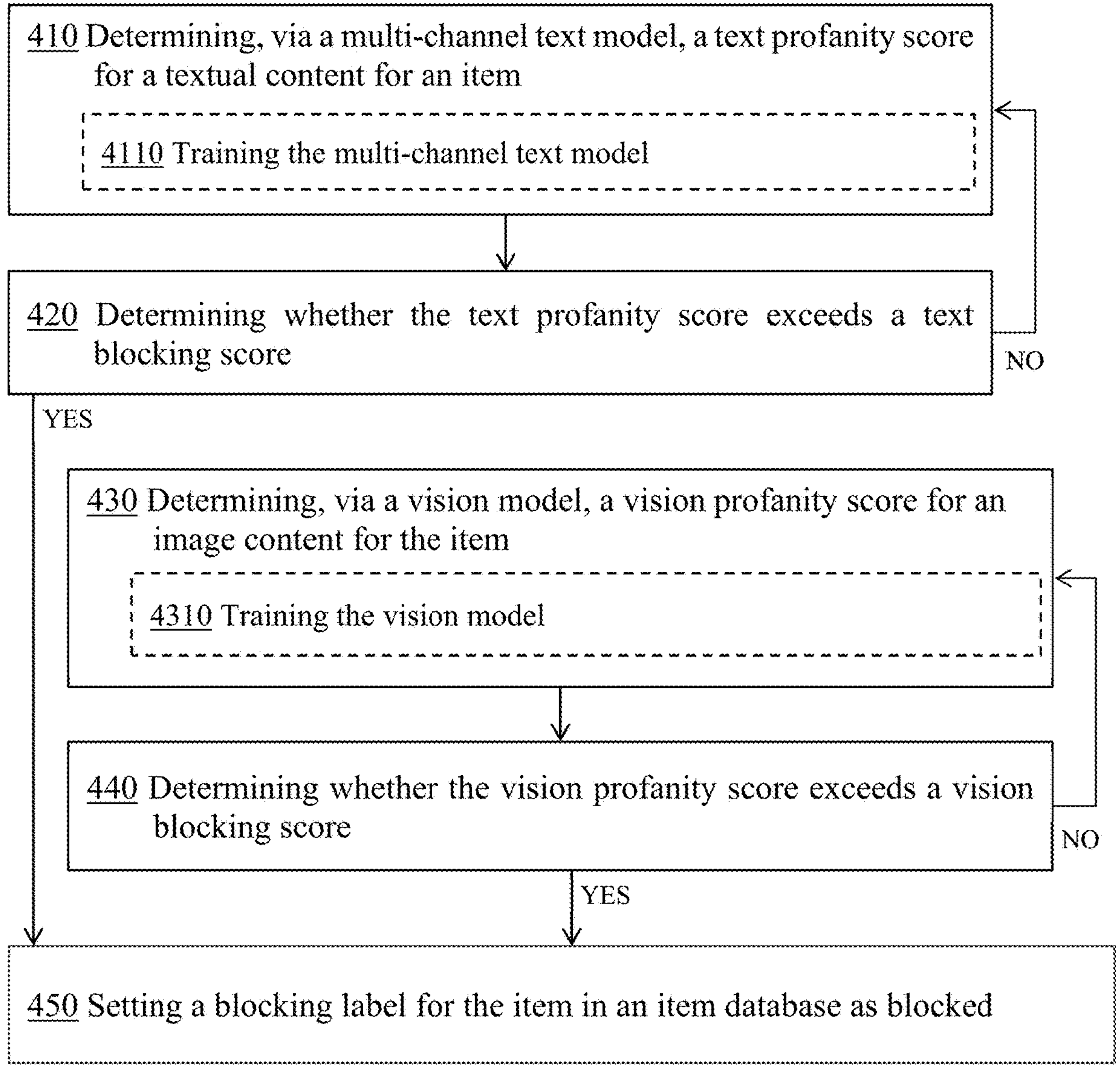
FIG. 4 illustrates a flow chart of a method for detecting and moderating offensive item contents, according to an embodiment.

Turning ahead in the drawings, FIG. 4 illustrates a flow chart for a method for detecting and moderating offensive item contents, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) and/or system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3) and/or system 310 (FIG. 3). The processor(s) can be similar or identical to the processor(s) described above with respect to computer system 100 (FIG. 1).

Referring to FIG. 4, method 400 can include a block 410 of determining, via a multi-channel text model (e.g., multi-channel text model 3110 (FIG. 3)), a text profanity score for a textual content for an item. In many embodiments, the multi-channel text model can include multiple ML models, modules, and/or systems, trained before determining the text profanity score. For example, the multi-channel text model can include a first channel text model (e.g., 1st-channel text model 3111 (FIG. 3), a Half-Bert model, a TF-IDF model, etc.), one or more second channel text models (e.g., 2nd-channel text model(s) 3112 (FIG. 3), a BERT model, a DistilBERT model, an XLNet model, etc.), and at least one integrating model (e.g., meta-learner model 3113 (FIG. 3), a MANN model, a MetaNet model, an RN model, etc.) configured to generate the text profanity score based on the outputs of the first channel text model and the one or more second channel text models.

In some embodiments, the first channel text model of the multi-channel text model used in block 410 can include: (a) a first text embedding generator (e.g., text embedding generators 31111 (FIG. 3), a context-aware embedding generator, a Half-Bert model, an LMv12 model, etc.) configured to generate a first text embedding for the textual content for the item; (b) a second text embedding generator (e.g., text embedding generators 31111 (FIG. 3), a statistics-based embedding algorithm, a TF model, a TF-IDF model, etc.) configured to generate a second text embedding for the textual content for the item; and (c) one or more lightweight regressor models (e.g., regressor model(s) 31112 (FIG. 3), a CatBoost model, a Ridge Regression model, etc.) configured to generate the first text profanity score for the textual content for the item based on the output embeddings of the first text embedding generator and the second text embedding generator.

In a number of embodiments, block 410 can include a block 4110 of training the multi-channel text model. In embodiments where the multi-channel text model is similar or identical to multi-channel text model 3110 (FIG. 3), block 4110 can include one or more of: (a) removing one or more unwanted elements (e.g., symbols, URLs, emojis, etc.) from training text data in one or more labeled comment databases (e.g., database(s) 320 (FIG. 3)); (b) training the first channel text model that is similar or identical to 1st-channel text model 3111 (FIG. 3) and configured to generate the first text profanity score for the textual content based on one or more labeled comment databases; and/or (c) training each of the one or more second channel text models that is similar or identical to 2nd-channel text model(s) 3112 (FIG. 3) and configured to generate the respective text profanity degree for the textual content for each of profanity categories based on the one or more labeled comment databases.

In many embodiments, method 400 further can include a block 420 of determining whether the text profanity score, as determined in block 410, exceeds a text blocking score. The text profanity score can be a numerical value in a predetermined range (e.g., 0-1, 0-10, 0-100, etc.), and the text blocking score can be determined manually or automatically (e.g., by system 300/310 (FIG. 3) or multi-channel text model 3110 (FIG. 3)).

In many embodiments, method 400 also can include a block 430 of determining, via a vision model (e.g., vision model 3120 (FIG. 3)), a vision profanity score for an image content for the item. Block 430 can be performed in series or in parallel with block 410 and/or block 420. The vision model can include an ensemble learning model with multiple ML models trained before determining the vision profanity score. The ensemble learning model can include: (a) a first vision model (e.g., 1st vision model 3121 (FIG. 3), a CNN model, ConvNext model, an EfficientNetB3 model, a ResNet model, etc.) configured to generate a first tensor; (b) one or more second vision models (e.g., 2nd vision model(s) 3122 (FIG. 3), a CNN model, ConvNext model, an EfficientNet model, etc.) configured to generate a second tensor; and (c) a linear layer (e.g., linear layer 3123 (FIG. 3)) configured to generate the vision profanity score based on the first tensor and the second tensor.

In a number of embodiments, block 430 can include a block 4310 of training the vision model to generate the vision profanity score for an item image based on one or more domain-specific labeled image databases (e.g., a retailer's product catalogs, database(s) 320 (FIG. 3)). In some embodiments, block 4310 further can include one or more of: (a) augmenting training image data in the one or more domain-specific labeled image databases; (b) stratifying the training image data in the one or more domain-specific labeled image databases based on one or more of item types or image labels for the training image data; and/or (c) training the vision model using multi-fold cross validation. Augmenting the training image data can include: (a) transforming (e.g., flipping, rotating, adjusting contrast, etc.) the training image data into varied image data; and (b) storing/adding the varied image data in the one or more domain-specific labeled image databases.

In certain embodiments, some of the multiple ML models of the multi-channel text model used in blocked 410 and/or the vision model in blocked 430 can be pre-trained and not retrained in blocks 4310 and/or 4110. In a number of embodiments, training the ML model(s) in blocks 4110 and/or 4310 can be performed periodically (e.g., every month, 2 months, 6 months, etc.).

In many embodiments, method 400 further can include a block 440 of determining whether the vision profanity score, determined in block 430, exceeds a vision blocking score. The vision profanity score can be a numerical value in a predetermined range (e.g., 0-1, 0-5, 0-10, etc.), and the vision blocking score can be determined manually or automatically (e.g., by system 300/310 (FIG. 3), or vision model 3120 (FIG. 3)).

In many embodiments, method 400 further can include a block 450 of setting a blocking label for the item in an item database (e.g., database(s) 320 (FIG. 3)) as blocked upon: (a) determining in blocks 420 that the text profanity score exceeds the text blocking score; or (b) determining in blocks 440 that the vision profanity score exceeds the vision blocking score. The blocking labels for items stored in the item database can be either blocked (e.g., 1) or unblocked (e.g., 0 or null).

Figure 5:
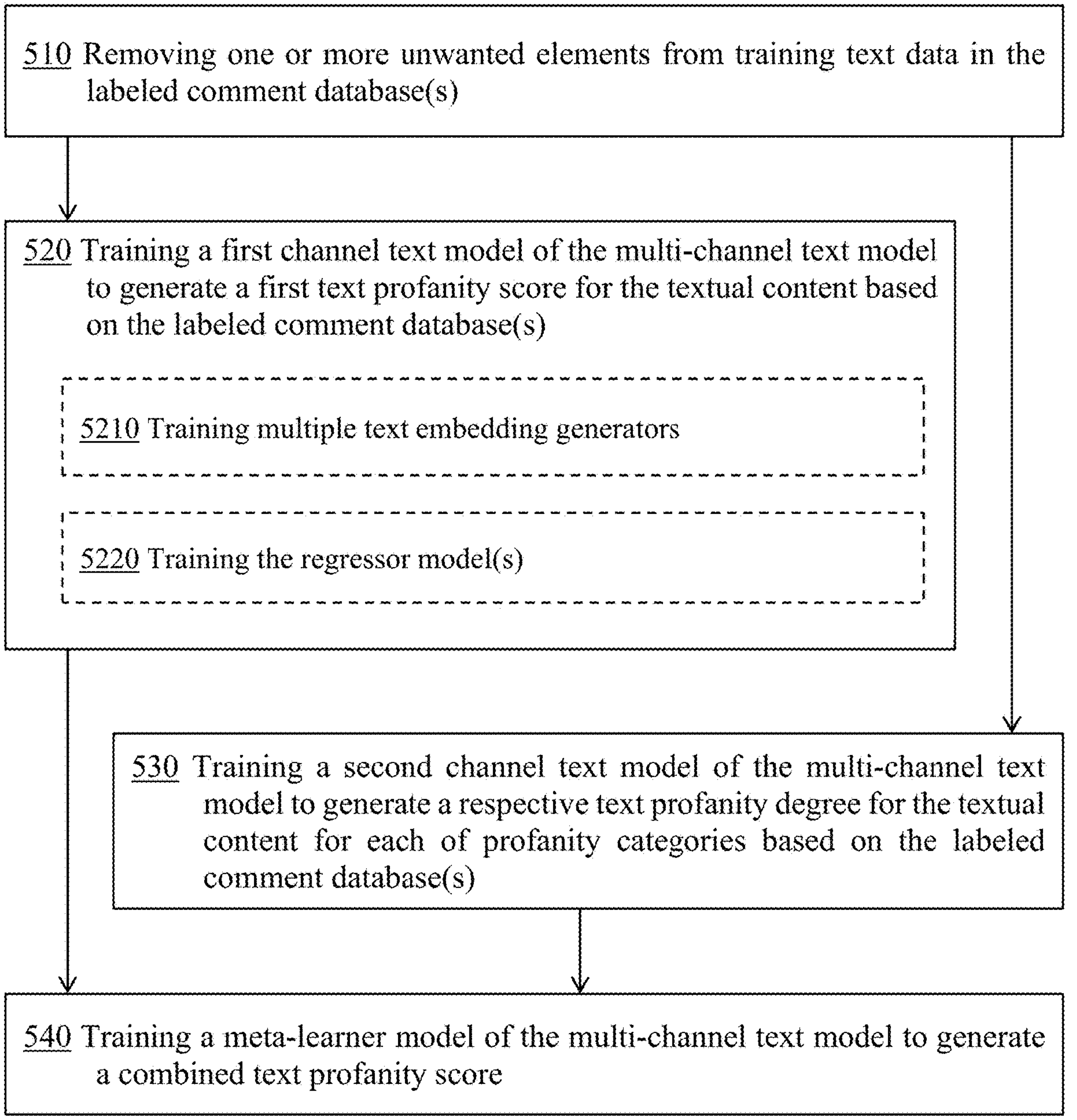
FIG. 5 illustrates a flow chart of a method for training a multi-channel text model, according to an embodiment.

Turning ahead in the drawings, FIG. 5 illustrates a flow chart of a method 500 for training a multi-channel text model, according to an embodiment. Method 500 is merely exemplary and is not limited to the embodiments presented herein. Method 500 can be employed in method 400 (FIG. 4), block 4110 (FIG. 4), and/or many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In many embodiments, system 300 (FIG. 3) and/or system 310 (FIG. 3) can be suitable to perform method 500 and/or one or more of the activities of method 500.

In many embodiments, system 300 (FIG. 3) and/or system 310 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3) and/or system 310 (FIG. 3). The processor(s) can be similar or identical to the processor(s) described above with respect to computer system 100 (FIG. 1).

In many embodiments, method 500 can include a block 510 of removing one or more unwanted elements from training text data in the labeled comment database(s) (e.g., database(s) 320 (FIG. 3), Civil Comments datasets, or historical input/output data of multi-channel text model 3110 (FIG. 3), 1st-channel text model 3111 (FIG. 3), 2nd-channel text model 3112 (FIG. 3), or block 410 (FIG. 4), etc.) to be used for training the multi-channel text model (e.g., multi-channel text model 3110 (FIG. 3)). Block 510 can remove the one or more unwanted elements (e.g., extra spaces, special symbols, embedded URL links, HTML tags, emojis, etc.) to streamline the training process for the multi-channel text model. The one or more unwanted elements can be pre-defined and/or updated manually or determined by a trained natural language model.

In many embodiments, method 500 further can include a block 520 of training a first channel text model (e.g., 1st-channel text model 3111 (FIG. 3)) of the multi-channel text model to generate a first text profanity score for the textual content based on the labeled comment database(s) storing the training text data. In some embodiments, the first channel text model can include multiple text embedding generators (e.g., text embedding generators 31111 (FIG. 3)) and one or more regressor models (e.g., regressor model(s) 31112 (FIG. 3)).

In a number of embodiments, the multiple text embedding generators (e.g., text embedding generators 31111 (FIG. 3)) of the first channel text model (e.g., 1st-channel text model 3111 (FIG. 3)) can include one or more context-aware embedding generators and/or one or more statistics-based embedding generators, etc. Examples of the context-aware embedding generators can include a Half-Bert embedding generator, an LMv12 embedding generator, a Word2Vec embedding generator, etc. Examples of the statistics-based embedding generators can include a TF embedding generator, a TF-IDF embedding generator, etc. In many embodiments, the multiple text embedding generators can be pre-trained to generate text embeddings. In some embodiments, block 520 can include a block 5210 of training the multiple text embedding generators, or at least some of the ML models used in the multiple text embedding generators.

In a number of embodiments, the one or more regressor models (e.g., regressor model(s) 31112 (FIG. 3)) of the first channel text model (e.g., 1st-channel text model 3111 (FIG. 3)) can each be a lightweight regressor, such as a XGBoost regressor, a CatBoost regressor, a Ridge Regression regressor, or an ElasticNet regressor, etc. In some embodiments, the one or more regressor models can be pre-trained to generate the first text profanity score for a textual content for an item. In several embodiments, block 520 further can include a block 5220 of training some or all of the regressor model(s), or at least some of the ML models used therein.

In many embodiments, method 500 further can include a block 530 of training a second channel text model (e.g., 2nd-channel text model(s) 3112 (FIG. 3)) of the multi-channel text model (e.g., multi-channel text model 3110 (FIG. 3)) to generate a respective text profanity degree for the textual content for each of profanity categories based on the labeled comment database(s) (e.g., database(s) 320 (FIG. 3)). Block 530 can be performed in series or in parallel with block 520. The second channel text model can include one or more ML models (e.g., 2nd-channel text model(s) 3112 (FIG. 3), a DistilBERT model, a RoBERTa model, etc.).

In many embodiments, method 500 further can include a block 540 of training a meta-learner model (e.g., meta-learner model 3113 (FIG. 3), a MetaNet model, an RN model, etc.) of the multi-channel text model (e.g., multi-channel text model 3110 (FIG. 3)) to generate a combined text profanity score for the textual content for an item based on training datasets outputs of the first channel text model and the second channel text model.

Figure 6:
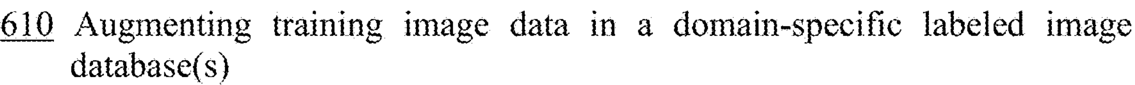
FIG. 6 illustrates a flow chart of a method for training a vision model, according to an embodiment, according to an embodiment.

FIG. 6 illustrates a flow chart for training a vision model, according to an embodiment. Method 600 is merely exemplary and is not limited to the embodiments presented herein. Method 600 can be employed in method 400 (FIG. 4), block 4310 (FIG. 4), and/or many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In many embodiments, system 300 (FIG. 3) and/or system 310 (FIG. 3) can be suitable to perform method 600 and/or one or more of the activities of method 600.

In many embodiments, system 300 (FIG. 3) and/or system 310 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300 (FIG. 3) and/or system 310 (FIG. 3). The processor(s) can be similar or identical to the processor(s) described above with respect to computer system 100 (FIG. 1).

In many embodiments, method 600 can include a block 610 of augmenting training image data in a domain-specific labeled image database(s) (e.g., database(s) 320 (FIG. 3), a retailer's product database with labeled product images, historical input/output data of vision model 3120 (FIG. 3) or block 430 (FIG. 4), etc.). Block 610 can augment the training image data by transforming the original training image data to into varied image data to be added to training datasets in the domain-specific labeled image database(s). In a number of embodiments, augmenting the training image data in block 610 can advantageously expand the limited training datasets, thus allowing the vision model to better learn from the available information, without extensive image collections. Transforming the training image data in block 610 further can advantageously ensure a robust vision model by increasing variations in the input data, thus enhancing the vision model's resilience against appearance variations in the input data. Examples of transformations in a training image can included one or more positional changes (e.g., rotation, horizontal flipping, and/or vertical flipping, etc.) applied to the original training image. Block 610 further can transform the training image by adjusting contrast using any suitable algorithms (e.g., Adaptive histogram equalization (AHE), Contrast Limited Adaptive Histogram Equalization (CLAHE), Sliding Window Adaptive Histogram Equalization (SWAHE), etc.) to improve the local contrast without exacerbating noise. Adjusting contrast in block 610 additionally can include computing multiple histograms for different sections of the training image to make the vision model more adaptable to input variations.

In many embodiments, method 600 further can include a block 620 of stratifying the training image data in the domain-specific labeled image database(s) based on one or more of item types (e.g., toys, pets, electronics, etc.) and/or image labels (assigned manually or previously generated by the pre-trained vision model) for the training image data. Stratifying the training image data in block 620 can advantageously provide the training image data with a balanced representation in terms of the item types and/or target image labels, thus enhancing the accuracy of the vision model to be trained.

In many embodiments, method 600 further can include a block 630 of training the vision model using multi-fold (e.g., 5-fold, 10-fold, 15-fold, etc.) cross validation. The multi-fold cross validation in block 630 can ensure a more robust and accurate vision model. The vision model can include an ensemble learning model comprising multiple vision models (e.g., vision model 3120 (FIG. 3), 1st vision model 3121 (FIG. 3), 2nd vision model(s) 3122 (FIG. 3), a CNN model, an EfficientNetB3 model, a ResNet model, etc.) and a linear layer (e.g., linear layer 3123 (FIG. 3), a neural network model, a fully-connected layer model, etc.). The multiple vision models (or some of them) can be pre-trained to generate tensors (e.g., 256-dimensional tensors) for an image, and/or the linear layer can be pre-trained to generate the vision profanity score based on a combination of the tensors generated by the multiple vision models. In a number of embodiments, block 630 can include a block 6310 of training one or more of the multiple vision model based on the training image data in the one or more domain-specific labeled image databases (e.g., database(s) 320 (FIG. 3)). In several embodiments, block 630 further can include a block of 6320 of training a linear layer to generate the vision profanity score for an item image based on training tensors in a database (e.g., database(s) 320 (FIG. 3)). Block 6310 and block 6320 can be performed independently.

Various embodiments can include a system for detecting and moderating offensive item contents and/or determining whether the items should be blocked or unblocked for online publication, promotion, and/or marketing. The system can include one or more processors and one or more non-transitory computer-readable media storing computing instructions configured to, when run on the one or more processors, cause the one or more processors to perform one or more acts. The one or more acts can include determining, via a multi-channel text model (e.g., multi-channel text model 3110 (FIG. 3)), a text profanity score for a textual content for an item.

In many embodiments, the multi-channel text model can include: (a) a first channel text model (e.g., 1st-channel text model 3111 (FIG. 3)); (b) a second channel text model (e.g., 2nd-channel text model(s) 3112 (FIG. 3)); and (c) a meta-learner model (e.g., meta-learner model 3113 (FIG. 3)). The first channel text model can be configured or trained to generate a first text profanity score for the textual content for the item. The second channel text model can be configured or trained to generate a respective text profanity degree for each of profanity categories (e.g., General Toxicity, Severe Toxicity, Threat, Insult, etc.) for the textual content for the item. The meta-learner model can be configured to generate the text profanity score for the textual content for the item based on: (i) a first text profanity score for the textual content for the item, as generated by the first channel text model at (a) above, and (ii) a respective text profanity degree for each of profanity categories for the textual content for the item, as generated by the second channel text model at (b) above.

In a number of embodiments, the first channel text model can include: (a) a first text embedding generator (e.g., text embedding generators 31111 (FIG. 3)); (b) a second text embedding generator (e.g., text embedding generators 31111 (FIG. 3)); and (c) one or more lightweight regressor models (e.g., regressor model(s) 31112 (FIG. 3)). The first text embedding generator can be further configured to cause the one or more processors to perform a context-aware embedding algorithm (e.g., BERT, Half-Bert, Word2Vec, etc.). The second text embedding generator can be further configured to cause the one or more processors to perform a statistics-based embedding algorithm (e.g., TF, TF-IDF, etc.).

In several embodiments, the one or more lightweight regressor models can be configured to generate the first text profanity score for the textual content for the item based on: (a) the first text embedding, as generated by the first text embedding generator; and (b) the second text embedding, as generated by the second text embedding generator. The one or more lightweight regressor models can be further configured to: (a) cause the one or more processors to perform at least two different regression algorithms (e.g., CatBoost and Ridge Regression, XGBoost and ElasticNet, etc.), each of the at least two different regression algorithms configured to generate a respective text score for the textual content for the item; and (b) determine the first text profanity score for the textual content for the item further based on the respective text score, as generated by each of the at least two different regression algorithms.

In a number of embodiments, the one or more acts further can include determining, via a vision model (e.g., vision model 3120 (FIG. 3)), a vision profanity score for an image content for the item. The vision model can include an ensemble learning model that includes: (a) a first vision model (e.g., 1st vision model 3121 (FIG. 3)) configured to generate a first tensor; (b) a second vision model (e.g., 2nd vision model 3122 (FIG. 3)) configured to generate a second tensor; and (c) a linear layer (e.g., linear layer 3123 (FIG. 3)) configured to generate the vision profanity score based on the first tensor and the second tensor.

In many embodiments, the one or more acts further can include determining whether the text profanity score, determined by the multi-channel text model, exceeds a text blocking score. In addition, the one or more acts can include determining whether the vision profanity score, as determined by the vision model, exceeds a vision blocking score. In many embodiments, the one or more acts further can include upon determining: (a) that the text profanity score exceeds the text blocking score, or (b) that the vision profanity score exceeds the vision blocking score, setting a blocking label for the item in an item database (e.g., database(s) 320 (FIG. 3)) as blocked.

In a number of embodiments, the one or more acts also can include training the multi-channel text model to generate the text profanity score for the textual content for the item based on one or more labeled comment databases (e.g., database(s) 320 (FIG. 3)). The act of training the multi-channel text model can include training the first channel text model to generate the first text profanity score for the textual content based on the one or more labeled comment databases. In some embodiments, the act of training the multi-channel text model further can include training the second channel text model to generate the respective text profanity degree for the textual content for each of profanity categories based on the one or more labeled comment databases. The second channel text model can be different form the first channel text model. The text profanity score can be determined based on the first text profanity score and the respective text profanity degree for each of the profanity categories.

In some embodiments, the act of training the multi-channel text model further can include, before training the first channel text model and before training the second channel text model, removing one or more unwanted elements from training text data in the one or more labeled comment databases. In many embodiments, the one or more lightweight regressor models can each be trained using multi-fold cross validation.

In many embodiments, the one or more acts additionally can include training the vision model (e.g., vision model 3120 (FIG. 3)) to generate the vision profanity score for an item image based on one or more domain-specific labeled image databases. The act of training the vision model further can include augmenting training image data in the one or more domain-specific labeled image databases. Augmenting the training image data can include: (a) transforming the training image data into varied image data, and storing the varied image data in the one or more domain-specific labeled image databases; and/or (b) stratifying the training image data in the one or more domain-specific labeled image databases based on one or more of item types or image labels for the training image data. Moreover, the act of training the vision model can include training the vision model using multi-fold cross validation.

Various embodiments further can include a method for detecting and moderating offensive item contents and/or determining whether each item should be blocked or unblocked for online publication, promotion, and/or marketing. The method can be implemented via execution of computing instructions configured to run at one or more processors and stored at one or more non-transitory computer-readable media. The method can include one or more of the acts performed by the systems and/or methods in the abovementioned embodiments.

In many embodiments, the techniques described herein can provide a practical application and several technological improvements. The techniques described herein can provide technological improvements to identifying, measuring, and addressing the presence of profanity in textual contents and/or nudity in image contents (e.g., product listing contents) in an integral architecture. Further, the techniques disclosed here can provide profanity and nudity detection approaches necessary for various online applications, such as online publication, promotion, and/or marketing, etc. These techniques described herein can provide a significant improvement over conventional approaches that fail to provide precise and/or efficient detection of improper contents.

In a number of embodiments, the techniques described herein can solve a technical problem that arises only within the realm of computer networks, as online promotion and/or marketing does not exist outside the realm of computer networks. Moreover, the techniques described herein can solve a technical problem that cannot be solved outside the context of computer networks. Specifically, the techniques described herein cannot be used outside the context of computer networks, in view of a lack of data.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although detecting and moderating offensive item contents and/or determining whether each item should be blocked or unblocked have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders. As another example, one or more of the procedures, processes, and/or activities of one of FIGS. 4-6 can be performed in another one of FIGS. 4-6.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions configured to, when run on the one or more processors, cause the one or more processors to perform:

determining, via a multi-channel text model, a combined text profanity score for textual content of an online promotion associated with an item, wherein the multi-channel text model comprises:

a first channel text model that generates one or more text embeddings for the textual content and generates a first text profanity score for the textual content from the one or more text embeddings;

a second channel text model that generates a respective text profanity degree for each of a plurality of profanity categories, wherein the respective text profanity degree is indicative of the textual content being classified into a respective profanity category, wherein the second channel text model is different from the first channel text model; and a meta-learner model that generates the combined text profanity score for the textual content by combining the first text profanity score with each of the respective text profanity degrees;

determining, via a vision model, a vision profanity score for image content of the online promotion, wherein the vision model generates one or more vision tensors for the image content and determines the vision profanity score from the vision tensors;

determining whether the combined text profanity score exceeds a text blocking score;

determining whether the vision profanity score exceeds a vision blocking score; and upon determining that the combined text profanity score exceeds the text blocking score or that the vision profanity score exceeds the vision blocking score, setting a blocking label for the item in an item database as blocked, wherein the item is blocked or unblocked in the online promotion based on the blocking label.

2. The system in claim 1, wherein the computing instructions are further configured to cause the one or more processors to perform one or more of:

training the multi-channel text model to generate the combined text profanity score for the textual content of the online promotion based on one or more labeled comment databases, comprising:

training the first channel text model to generate the first text profanity score for the textual content based on the one or more labeled comment databases; and training the second channel text model to generate the respective text profanity degree for the textual content for each of profanity categories based on the one or more labeled comment databases, wherein:

the combined text profanity score is determined based on the first text profanity score and the respective text profanity degree for each of the profanity categories; or training the vision model to generate the vision profanity score for the image content based on one or more domain-specific labeled image databases.

3. The system in claim 2, wherein:

training the multi-channel text model further comprises, before training the first channel text model and before training the second channel text model, removing one or more unwanted elements from training text data in the one or more labeled comment databases.

4. The system in claim 2, wherein:

training the vision model further comprises one or more of:

augmenting training image data in the one or more domain-specific labeled image databases, comprising:

transforming the training image data into varied image data; and storing the varied image data in the one or more domain-specific labeled image databases;

stratifying the training image data in the one or more domain-specific labeled image databases based on one or more of item types or image labels for the training image data; or training the vision model using multi-fold cross validation.

5. The system in claim 1, wherein the first channel text model comprises:

a first text embedding generator that generates a first text embedding for the textual content of the online promotion;

a second text embedding generator configured to generate a second text embedding for the textual content of the online promotion; and one or more lightweight regressor models that generates the first text profanity score for the textual content of the online promotion based on:

the first text embedding, as generated by the first text embedding generator; and the second text embedding, as generated by the second text embedding generator.

6. The system in claim 5, wherein the one or more lightweight regressor models are further configured to:

cause the one or more processors to perform at least two different regression algorithms, each of the at least two different regression algorithms generates a respective text score for the textual content of the online promotion; and determine the first text profanity score for the textual content of the online promotion further based on the respective text score, as generated by each of the at least two different regression algorithms.

7. The system in claim 5, wherein:

the one or more lightweight regressor models are each trained using multi-fold cross validation.

8. The system in claim 5, wherein one or more of:

the first text embedding generator is further configured to cause the one or more processors to perform a context-aware embedding algorithm; or the second text embedding generator is further configured to cause the one or more processors to perform a statistics-based embedding algorithm.

9. The system in claim 1, wherein the vision model comprises an ensemble learning model comprising:

a first vision model that generates a first tensor;

a second vision model that generates a second tensor; and a linear layer that generates the vision profanity score based on the first tensor and the second tensor.

10. The system in claim 1, wherein the online promotion comprises a social media promotion comprising the textual content and the image content, wherein the item is content of the social media promotion that is promoted by the social media promotion.

11. The system in claim 1, wherein the item is associated with metadata in the item database, wherein the blocking label is set in the metadata.

12. A method being implemented via execution of computing instructions configured to run at one or more processors and stored at one or more non-transitory computer-readable media, the method comprising:

determining, via a multi-channel text model, a combined text profanity score for textual content of an online promotion associated with an item, wherein the multi-channel text model comprises:

a first channel text model that generates one or more text embeddings for the textual content and generates a first text profanity score for the textual content from the one or more text embeddings;

a second channel text model that generates a respective text profanity degree for each of a plurality of profanity categories, wherein the respective text profanity degree is indicative of the textual content being classified into a respective profanity category, wherein the second channel text model is different from the first channel text model; and a meta-learner model that generates the combined text profanity score for the textual content by combining the first text profanity score with each of the respective text profanity degrees;

determining, via a vision model, a vision profanity score for image content of the online promotion, wherein the vision model generates one or more vision tensors for the image content and determines the vision profanity score from the vision tensors;

determining whether the combined text profanity score exceeds a text blocking score;

determining whether the vision profanity score exceeds a vision blocking score; and upon determining that the combined text profanity score exceeds the text blocking score or that the vision profanity score exceeds the vision blocking score, setting a blocking label for the item in an item database as blocked, wherein the item is blocked or unblocked in the online promotion based on the blocking label.

13. The method in claim 12, further comprising one or more of:

training the multi-channel text model to generate the combined text profanity score for the textual content of the online promotion based on one or more labeled comment databases, comprising:

training the first channel text model to generate the first text profanity score for the textual content based on the one or more labeled comment databases; and training the second channel text model to generate the respective text profanity degree for the textual content for each of profanity categories based on the one or more labeled comment databases, wherein:

the combined text profanity score is determined based on the first text profanity score and the respective text profanity degree for each of the profanity categories; or training the vision model to generate the vision profanity score for the image content based on one or more domain-specific labeled image databases.

14. The method in claim 13, wherein:

training the multi-channel text model further comprises, before training the first channel text model and before training the second channel text model, removing one or more unwanted elements from training text data in the one or more labeled comment databases.

15. The method in claim 13, wherein:

training the vision model further comprises one or more of:

augmenting training image data in the one or more domain-specific labeled image databases, comprising:

transforming the training image data into varied image data; and storing the varied image data in the one or more domain-specific labeled image databases;

stratifying the training image data in the one or more domain-specific labeled image databases based on one or more of item types or image labels for the training image data; or training the vision model using multi-fold cross validation.

16. The method in claim 12, wherein the first channel text model comprises:

a first text embedding generator that generates a first text embedding for the textual content of the online promotion;

a second text embedding generator that generates a second text embedding for the textual content of the online promotion; and one or more lightweight regressor models that generates the first text profanity score for the textual content of the online promotion based on:

the first text embedding, as generated by the first text embedding generator; and the second text embedding, as generated by the second text embedding generator.

17. The method in claim 16, wherein the one or more lightweight regressor models are further configured to:

cause the one or more processors to perform at least two different regression algorithms, each of the at least two different regression algorithms generates a respective text score for the textual content of the online promotion; and determine the first text profanity score for the textual content of the online promotion further based on the respective text score, as generated by each of the at least two different regression algorithms.

18. The method in claim 16, wherein:

the one or more lightweight regressor models are each trained using multi-fold cross validation.

19. The method in claim 16, wherein one or more of:

the first text embedding generator is further configured to cause the one or more processors to perform a context-aware embedding algorithm; or the second text embedding generator is further configured to cause the one or more processors to perform a statistics-based embedding algorithm.

20. The method in claim 12, wherein the vision model comprises an ensemble learning model comprising:

a first vision model that generates a first tensor;

a second vision model that generates a second tensor; and a linear layer that generates the vision profanity score based on the first tensor and the second tensor.

* * * * *